United States Patent
Daley et al.

(10) Patent No.: US 11,971,081 B2
(45) Date of Patent: Apr. 30, 2024

(54) STRUCTURAL DAMPER

(71) Applicant: BAE SYSTEMS plc, London (GB)

(72) Inventors: Stephen Daley, Southampton (GB);
Kristian Edward Hook, Southampton (GB); Jordan Cheer, Southampton (GB)

(73) Assignee: BAE SYSTEMS PLC, London (GB)

( * ) Notice: Subject to any disclaimer, the term of this patent is extended or adjusted under 35 U.S.C. 154(b) by 394 days.

(21) Appl. No.: 17/593,577

(22) PCT Filed: Mar. 23, 2020

(86) PCT No.: PCT/GB2020/050769
§ 371 (c)(1),
(2) Date: Sep. 21, 2021

(87) PCT Pub. No.: WO2020/201711
PCT Pub. Date: Oct. 8, 2020

(65) Prior Publication Data
US 2022/0170526 A1    Jun. 2, 2022

(30) Foreign Application Priority Data

Mar. 29, 2019 (EP) .................................... 19275036
Mar. 29, 2019 (GB) .................................... 1904426

(51) Int. Cl.
*G10K 11/178* (2006.01)
*F16F 7/00* (2006.01)
(Continued)

(52) U.S. Cl.
CPC .......... *F16F 7/00* (2013.01); *G10K 11/17861* (2018.01); *G10K 11/17875* (2018.01);
(Continued)

(58) Field of Classification Search
CPC ................. F16F 7/00; G10K 11/17861; G10K 11/17875; G10K 2210/1282;
(Continued)

(56) References Cited

U.S. PATENT DOCUMENTS

| 5,142,511 A * | 8/1992 | Kanai .................... B06B 1/0625 367/164 |
| 5,719,945 A | 2/1998 | Fuller et al. |

(Continued)

FOREIGN PATENT DOCUMENTS

| DE | 102008011009 A1 | 8/2009 |
| DE | 102015100442 A1 | 7/2016 |

(Continued)

OTHER PUBLICATIONS

International Preliminary Report on Patentability received for PCT Application No. PCT/GB2020/050769. Mail date: Oct. 14, 2021. 10 pages.

(Continued)

*Primary Examiner* — Thomas W Irvin
(74) *Attorney, Agent, or Firm* — Finch & Maloney PLLC

(57) ABSTRACT

A structural damper (2) having an acoustic black hole (5), at least one sensor (7), a damper structure (4), an actuator (8) configured to apply an actuating force to the damper structure (4) and a controller (H) configured to control the actuator in dependence on a signal from the at least one sensor so as to provide structural damping of a primary structure (3).

20 Claims, 10 Drawing Sheets

(51) Int. Cl.
   *G10K 11/16* (2006.01)
   *B60K 5/12* (2006.01)
   *E04B 1/98* (2006.01)

(52) U.S. Cl.
   CPC .............. *B60K 5/1283* (2013.01); *E04B 1/98* (2013.01); *G10K 2210/1282* (2013.01); *G10K 2210/3211* (2013.01); *G10K 2210/3224* (2013.01)

(58) Field of Classification Search
   CPC ... G10K 2210/3211; G10K 2210/3224; G10K 11/36; G10K 11/16; B60K 5/1283; E04B 1/98
   See application file for complete search history.

(56) References Cited

U.S. PATENT DOCUMENTS

| | | | | |
   |---|---|---|---|---|
   | 6,061,456 A * | 5/2000 | Andrea | ................... | H04M 9/08 381/71.7 |
   | 7,573,177 B2 * | 8/2009 | Fuller | ................... | F16F 1/361 310/317 |
   | 7,712,580 B2 * | 5/2010 | Fuller | ................... | F16F 7/104 181/294 |
   | 8,611,576 B2 * | 12/2013 | Borgmann | ......... | G10K 11/1754 381/345 |
   | 10,900,934 B2 * | 1/2021 | Giurgiutiu | ............. | G01N 29/11 |
   | 2013/0071251 A1 * | 3/2013 | Relancio | ............... | F04D 29/324 416/223 R |
   | 2013/0181689 A1 * | 7/2013 | Ocalan | ................... | H02K 35/00 322/3 |

FOREIGN PATENT DOCUMENTS

| | | |
   |---|---|---|
   | DE | 102016116554 B3 | 12/2017 |
   | WO | 2020201711 A1 | 10/2020 |

OTHER PUBLICATIONS

International Search Report and Written Opinion received for PCT Application No. PCT/GB2020/050769. Mail date: Jun. 19, 2020. 12 pages.
   GB Search Report under Section 17(5) received for GB Application No. GB1904426.2, dated Jul. 30, 2019. 3 pages.
   Extended European Search Report received for EP Application No. 19275036.2, dated Sep. 24, 2019. 9 pages.

* cited by examiner

STRUCTURAL DAMPER

BACKGROUND OF THE INVENTION

The present invention relates to a structural damper, in particular a structural damper comprising an acoustic black hole. The present invention also relates to a structure that is damped by the structural damper and to a method of structural damping using the structural damper.

In product design, it is often necessary to design a product that is both lightweight and a low noise structure. However, this results in a conflict between reducing the weight and increasing the sound radiation from the structure. It is known to use a structure referred to as an acoustic black hole (ABH) to provide structural damping.

An acoustic black hole was originally described by Mironov in 1988 (M. A. Mironov. Propagation of a flexural wave in a plate whose thickness decreases smoothly to zero in a finite interval. Soviet Physics: Acoustics, 34(3):318-319, 1988). The acoustic black hole effect is typically achieved by introducing a power law taper into a beam or plate that changes the thickness over a set distance. This change in thickness profile causes the flexural waves propagating along the direction of the ABH to decrease in wave speed. In the theoretical limit, there is no reflection of the waves from the ABH. The ABH effect can also be achieved using other gradient functions, including a power-cosine curve, for example.

FIG. 9 shows an example of an ABH 1000 on a beam 1001. The ABH 1000 is provided with a layer of damping material 1002. The flexural wave speed $c_f(x)$, decreases as the taper height decreases as:

$$c_f(x) = \left(\frac{Eh^2(x)}{12\rho_s}\right)^{\frac{1}{4}} \omega^{\frac{1}{2}} \quad (1)$$

Where E is the Young's modulus of the ABH material, h(x) is the height of the taper, p s is the density of the ABH material and co is the angular frequency.

From equation 1 it can be seen that if the tip of the ABH reduces to zero thickness, i.e. h(x)=0, then the flexural wave speed at the tip will be $c_f(x)$=0. In this ideal, theoretical case, the incident wave will not be reflected from the end of the tapered beam and will therefore, be effectively attenuated. However, a practical ABH is limited by both structural requirements and manufacturing limitations, which means that the tip height must be finite and the length of the taper is limited. Accordingly, the attenuation achieved by the ABH effect is greatly reduced.

To overcome these practical limitations, there have been a number of investigations into maximising the attenuation achieved by a practical ABH. For example, the application of a thin layer of passive damping material has been shown to improve the performance of a truncated ABH with a taper longer than one flexural wavelength.

In relation to vibration energy harvesting, this layer of damping material has been replaced with piezoelectric transducers (PZT) that are individually shunted on external resistors (F. Semperlotti L. Zhao. *Embedded acoustic black holes for semi-passive broadband vibration attenuation in thin walled structures. Journal of Sound and Vibration,* 388:42-52, 2016). The resistors provide for dissipation of the electrical energy generated by the PZTs, therefore resulting in effective damping. However, the effect of the shunted PZTs on the damping is only marginal (compared to the damping provided by the ABH) and the overall damping is generally limited to the attenuation of higher frequencies.

To broaden the potential applications of ABHs, it is desirable to overcome this limitation and increase the low frequency attenuation capability.

The present invention seeks to address or mitigate at least some of the above-mentioned problems. Alternatively, or additionally, the present invention seeks to provide an improved structural damper. Alternatively, or additionally, the present invention seeks to provide an improved structurally damped structure. Alternatively, or additionally, the present invention seeks to provide an improved method of structural damping.

SUMMARY OF THE INVENTION

According to a first aspect of the invention there is provided a structural damper comprising:
- an acoustic black hole;
- at least one sensor;
- a damper structure;
- an actuator configured to apply an actuating force to the damper structure; and
- a controller configured to control the actuator in dependence on a signal from the at least one sensor so as to provide structural damping of a primary structure.

The use of the controller and actuator, to provide a controlled actuating force to the damper structure may advantageously improve the low-frequency performance of an acoustic black hole (ABH), which may allow for the use of structural damping, using an acoustic black hole, in a more effective way and in a wider variety of applications. It may also control resonances that would otherwise occur.

Any suitable type of acoustic black hole may be used. The acoustic black hole may be one dimensional, two-dimensional, or three-dimensional for example.

The acoustic black hole may be a structure that has a variation in structure and/or material such that it causes a decrease in wave speed of flexural waves in the acoustic black hole, thereby reducing the reflection of the flexural waves from the acoustic black hole. The acoustic black hole may attenuate the structural waves passing into the acoustic black hole.

The variation in structure may be a variation in thickness, which may be a tapering in thickness.

In this respect, acoustic black holes are known in the art. For example, 'Higher-order WKB analysis of reflection from tapered elastic wedges' Journal of Sound and Vibration 449 (2019) 368-388 (Angelis Karlos, Stephen J. Elliot, Jordan Cheer), the contents of which are incorporated herein, provides examples of different types of 'one-dimensional' acoustic black holes. The thickness variations, of these acoustic black holes, are according to the expressions provided in Table 1 below:

TABLE 1

| Thickness profile type | Thickness variation | Length of ideal wedge | Decay parameter |
|---|---|---|---|
| Power-law | $h = h_0\left(1 - \dfrac{x}{x_0}\right)^n$ | $x_0 = \dfrac{x_1}{1 - \left(\dfrac{h_1}{h_0}\right)^{1/n}}$ | — |
| Exponential | $h = h_0 e^{-\beta x}$ | $\infty$ | $\beta = \dfrac{1}{x_1 \ln\left(\dfrac{h_0}{h_1}\right)}$ |
| Power-cosine | $h = h_0 \cos^n\left(\dfrac{\pi x}{2 x_0}\right)$ | $x_0 = \dfrac{\pi x_1}{2\arccos\left(\left(\dfrac{h_1}{h_0}\right)^{1/n}\right)}$ | — |
| Gaussian | $h = h_0 e^{-\gamma x^2}$ | $\infty$ | $\gamma = \dfrac{1}{x_1^2 \ln\left(\dfrac{h_0}{h_1}\right)}$ |
| Compound power-law | $h = \begin{cases} \dfrac{h_0}{2}\left(2 - \left(\dfrac{2x}{x_0}\right)^n\right), & 0 \le x \le \dfrac{x_0}{2} \\ \dfrac{h_0}{2}\left(2 - \dfrac{2x}{x_0}\right)^n, & \dfrac{x_0}{2} \le x \le x_0 \end{cases}$ | $x_0 = \dfrac{2 x_1}{2 - \left(\dfrac{h_1}{h_0}\right)^{1/n}}$ | — |

Where:

'x' is the distance, in the length direction, from the upstream end of the acoustic black hole (i.e. at the start of the taper);

'$x_1$' is the length of the acoustic black hole;

'h' is the thickness of the acoustic black hole (at position (x));

'$h_0$' is the thickness of the acoustic black hole at the upstream end of the acoustic black hole (i.e. at position (x=0));

'$h_1$' is the thickness of the acoustic black hole at the downstream end of the acoustic black hole (i.e. at position (x=$x_1$));

'n' is power coefficient of the shape function (which must be greater or equal to 2).

These parameters are illustrated in FIG. 9.

'Two-dimensional' acoustic black holes are also known in the art. They may, for example, have expressions that define their variation in thickness that are equivalent to the above expressions for a 'one-dimensional' acoustic black hole, but applied in two-dimensions (e.g. rotated about the centre of the taper). The two-dimensional acoustic black hole may comprise a two-dimensional structure, e.g. a plate, for example.

The acoustic black hole may, for example, be any of the one dimensional or two-dimensional acoustic black holes referred to above.

The acoustic black hole may be a 'three-dimensional' acoustic black hole. In this case, the acoustic black hole may have expressions that define their variation in thickness that are equivalent to the above expressions for a 'one-dimensional' acoustic black hole, but applied in three-dimensions.

The acoustic black hole may be provided with passive damping. For example, the acoustic black hole may comprise one or more layers of damping material. The damping material may be of any material suitable for providing structural damping, i.e. for absorbing energy of vibration.

Providing the acoustic black hole with passive damping may allow the model used by the controller to use fewer coefficients, without any substantial reduction in performance. This may enable the controller to be more computationally efficient, thereby allowing a lower power and lower cost controller to be used. This may also allow the actuator to be smaller.

Furthermore, the invention recognises that the sum of the effects of the active and passive damping is significantly greater than would be expected. In this respect, due to an unexpected synergy, the performance is significantly greater than the sum of the effects of the active and passive damping alone.

The actuator may be configured to apply the actuating force to the acoustic black hole. This may advantageously act to control the vibrational energy in the acoustic black hole, which may cause the actuator to have a greater damping effect. Accordingly this may allow for a reduction in the size (and strength) of the actuator, that would otherwise be required.

In embodiments of the invention the damper structure is coupled to the acoustic black hole (i.e. mechanically coupled) such that it can transmit energy through its structure (i.e. mechanical energy) to and from the acoustic black hole. In this respect, the damper structure may be a structure that is coupled to the acoustic black hole such that it can transmit vibration and/or flexural waves along its structure to and from the acoustic black hole. In embodiments of the invention the damper structure is a solid structure.

The damper structure may comprise the acoustic black hole. The acoustic black hole may form only part of the damper structure. The actuator may be configured to apply the actuating force to the damper structure at a different location to the acoustic black hole. This may provide an advantage in that the actuator does not reduce the acoustic black hole effect by loading the tapered part of the damper. It may also allow thinner taper tip heights to be used since the taper does not have to support the mass of the actuator and it allows the passive damping treatment to be optimised without constraints imposed by the collocation of the actuator.

In this respect, the damper structure may comprise a section that is coupled to the acoustic black hole, for example by attachment to the acoustic black hole or by being integrally formed with acoustic black hole. The actuator may be configured to apply the actuating force to said section. The actuator may be configured to apply the actuating force to the damper structure at a location upstream of the acoustic black hole.

The acoustic black hole may form the entire damper structure. In this respect, acoustic black hole may be the damper structure.

The damper structure may be coupled to the primary structure. In this respect, the damper structure may be coupled to the primary structure (i.e. mechanically coupled) such that it can transmit energy through its structure (i.e. mechanical energy) to and from the primary structure. The damper structure may be a structure that is coupled to the primary structure such that it can transmit vibration and/or flexural waves along its structure to and from the primary structure. The damper structure may be attached to the primary structure.

The damper structure may form at least a part of the primary structure. In this respect, the damper structure may be embedded in the primary structure.

The damper structure may be the primary structure.

Where the damper structure forms at least a part of the primary structure it may form only part of the primary structure or it may form the entire primary structure. In this respect, the damper structure and primary structure may be formed by the same structure.

The damper structure may be of any suitable type. The damper structure may be, or comprise, a beam or plate, for example.

In embodiments of the invention energy is input from the actuator into the damper structure. In this respect, the actuator may be connected to a power source, for example an electrical power supply, that powers the actuator.

In embodiments of the invention the at least one sensor is configured to sense a value that is dependent on or can be related to at least one of:
 (a) the vibration of the primary structure;
 (b) a flexural wave in the primary structure;
 (c) the acoustic radiation from the primary structure.

The at least one sensor may be configured to sense a value that is dependent on or can be related to at least one of the vibration of the damper structure and/or a flexural wave in the damper structure.

The at least one sensor may be configured to sense the vibration of the damper structure and/or a flexural wave in the damper structure.

In embodiments of the invention the sensed value is a physical value. The sensed value may be of, or from, a sensed structure. The sensed value may be movement (e.g. displacement or velocity) of a sensed structure (i.e. a structure for which this value is sensed by the at least one sensor), including a sensed vibration or flexural wave passing along a sensed structure. The sensed structure may be a structure that energy (i.e. mechanical energy) is transmitted to, from a source of vibration that applies a vibratory force to the primary structure. The sensed structure may be the primary structure and/or the damper structure. The at least one sensor may be configured to sense movement of the damper structure or of the primary structure. The at least one sensor may be located at the acoustic black hole (i.e. the acoustic black hole is the sensed structure).

The sensed value may be acoustic radiation from the primary structure. In this respect, the at least one sensor may be configured to sense the acoustic radiation from the primary structure.

The at least one sensor may be of any suitable type. The at least one sensor may be a displacement, velocity or acceleration sensor. The at least one sensor may be a PZT, a scanning laser vibrometer. The at least on sensor may be an acoustic sensor (e.g. a microphone), etc.

In embodiments of the invention the controller is configured to control the actuator so as to control the actuating force applied by the actuator to the damper structure.

It will be appreciated that 'in dependence on a signal from the at least one sensor' includes where the controller controls the actuator based on one or more values calculated from, based on, or otherwise derived from, the signal from the at least one sensor.

The controller may be configured to calculate one or more values based on the signal from the at least one sensor (i.e. from the value(s) sensed by the at least one sensor). As an example, the sensed value may be a displacement or velocity of the sensed structure over time. The controller may be configured to calculate, from this sensed value, the vibration or flexural wave passing along the sensed structure. The at least one sensor may comprise first and second sensors. The controller may be configured to control the actuator in dependence on the signals from the first and second sensors. One of the first and second sensors may provide a reference to the signal and the other may provide an error signal. The first and second sensors may be configured to sense movement of the sensed structure, the controller being configured to decompose the signals from the first and second sensors into incident and reflected components, with the incident wave component forming a reference signal and the reflected wave component forming an error signal. In this respect, the controller may comprise a wave decomposition unit configured to perform this decomposition of signals. Where the at least one sensor is configured to sense acoustic radiation from the primary structure, the controller may be configured to calculate the radiated sound field from the primary structure. The controller may be configured to control the actuator in dependence on the calculated value(s).

The controller may be configured to receive a signal from the at least one sensor and to control the actuator in dependence on the received signal so as to provide structural damping of the primary structure.

The controller may receive a feedforward and/feedback signal from the at least one sensor, or based on the signal from the at least one sensor. In this respect, the controller and the at least one sensor may form a, or part of a, feedforward, feedback or hybrid (feedforward and feedback) control system.

For example, the at least one sensor may be upstream of the actuator. In this case, the controller may receive a feedforward signal from the at least one sensor, or based on the signal from the at least one sensor. The at least one sensor may be downstream of the actuator, or at the actuator. In this case, the controller may receive a feedback signal from the at least one sensor, or based on the signal from the at least one sensor.

The controller may be implemented by any suitable hardware and/or software. Any suitable type of controller may be used, including filtered-reference Least Mean Squares (FxLMS), velocity feedback, pole placement, etc. for example The controller may be configured to control the actuating force applied by the actuator, to the damper structure, so as to control at least one of:
 (a) the vibration of the primary structure;
 (b) a flexural wave in the primary structure; and
 (c) the acoustic radiation from the primary structure.

In this respect, the controller may be configured to control the actuating force applied by the actuator, to the damper structure, so as to control the vibration of the primary structure. The controller may be configured to control the actuating force applied by the actuator, to the damper structure, so as to control a flexural wave in the primary structure. The controller may be configured to control the actuating force applied by the actuator, to the damper structure, so as to control the acoustic radiation from the primary structure.

The controller may be configured to attenuate the vibration of the primary structure (i.e. compared to if the structural damper was not present). The controller may be configured to minimise the vibration of the primary structure. The controller may be configured to maximise the absorption of vibration by the damper structure.

The controller may be configured to attenuate the flexural wave in the primary structure (i.e. compared to if the structural damper was not present).

The controller may be configured to reduce the acoustic radiation from the primary structure (i.e. compared to if the structural damper was not present). The controller may be configured to minimise the acoustic radiation from the primary structure.

Optionally the acoustic black hole is configured to attenuate at least one of (a) to (c) at relatively high frequencies and the controller is configured to attenuate at least one of (a) to (c) at relatively low frequencies. It will be appreciated that 'relatively high' and 'relatively low' frequency are relative to each other.

The controller may be configured to control any combination of features (a) to (c). The controller may be configured to control all of features (a) to (c).

Optionally the controller is configured to control at least one of features (a) to (c) by controlling the vibration of the damper structure and/or a flexural wave in the damper structure.

In this respect, optionally the controller is configured to control at least one of features (a) to (c) by controlling the vibration of the damper structure.

The controller may increase and/or decrease the actuating force applied to the damper structure so as to control any of features (a) to (c).

The controller may be configured to minimise the vibration of the damper structure and/or to maximise the absorption of vibration by the damper structure. Alternatively, or additionally, the controller may increase the vibration of the damper structure, in order to attenuate any of features (a) to (c) of the primary structure.

Where the controller is configured to control at least one of features (a) to (c) by controlling the vibration of the damper structure, the at least one sensor may be located at or downstream of the actuator. In this respect, the at least one sensor may be provided at the acoustic black hole.

The controller may receive a feedback signal from the at least one sensor, or based on the signal from the at least one sensor.

Optionally the at least one sensor comprises a first sensor that is located upstream of the actuator and wherein the controller receives a feedforward signal from the first sensor, or based on the signal from the first sensor.

The first sensor may be configured to sense movement of the damper structure. Alternatively, or additionally, the first sensor may be configured to sense movement of the primary structure.

Optionally the at least one sensor comprises a second sensor and wherein the controller receives a feedback signal from the second sensor, or based on the signal from the second sensor and wherein the controller is configured to control the actuator in dependence on the signals from, or based on, the signals from first and second sensors so as to control at least one of features (a) to (c)

Optionally the controller is configured to control at least one of features (a) to (c) by controlling a flexural wave in the damper structure. In this case, the controller may be configured to control the reflected flexural wave from the acoustic black hole. The controller may be configured to minimise the reflected flexural wave from the acoustic black hole.

Optionally the controller is configured to control the acoustic radiation from the primary structure. The controller may be configured to minimise the acoustic radiation from the primary structure.

The at least one sensor may be an acoustic sensor configured to sense the acoustic radiation from the primary structure.

Optionally the at least one sensor comprises a first sensor positioned upstream of the actuator and the controller receives a feedforward signal from the first sensor, or based on the signal from the first sensor and a second sensor at or downstream of the actuator and configured to sense movement of the damper structure and the controller receives a feedback signal from the second sensor, or based on the signal from the second sensor and wherein the controller is configured to control the actuator in dependence on the received signals from the first and second sensors so as to control the acoustic radiation from the primary structure.

The damper structure may be coupled to a primary structure so as to provide structural damping to the primary structure. The damper structure may be attachable to a primary structure so as to provide structural damping to the primary structure.

The structural damper may comprise a plurality of said damper structures.

The actuator may be of any suitable type, including a PZT, an electro-magnetic actuator, a pneumatic or hydraulic actuator, etc.

The structural damper may comprise a plurality of said actuators.

According to a second aspect of the invention there is provided a structurally damped structure comprising a primary structure and a structural damper according to the first aspect of the invention arranged to provide structural damping of the primary structure.

The structurally damped structure may comprise a plurality of structural dampers according to the first aspect of the invention, that are each arranged to provide structural damping of the primary structure.

The structural dampers may be arranged to provide structural damping at different locations on the primary structure.

In embodiments of the invention the primary structure is a structure that, in use, has a vibration applied to it. The primary structure may be a structure that is vibrated, directly or indirectly, by a source of vibration.

The primary structure may be a structure that can transmit energy through its structure. In this respect, the primary structure may be a structure that is for transmitting vibration and/or flexural waves along its structure and/or emitting acoustic radiation due to its vibration and/or transmittal of flexural waves.

The primary structure may be a component or part of a vehicle, for example a structural part of the vehicle. The vehicle may, for example, be an automobile, aircraft or vessel. As a further example, the vehicle may be a submarine.

The primary structure may be a structure of a building, bridge, pipe, dam, canal, etc.

According to a third aspect of the invention there is provided a method of providing structural damping to a primary structure, using a structural damper, the structural damper comprising:
- an acoustic black hole;
- at least one sensor;
- a damper structure; and
- an actuator configured to apply an actuating force to the damper structure;
- wherein the method comprises controlling the actuator in dependence on a signal from the at least one sensor so as to provide structural damping of a primary structure.

Optionally the actuator is configured to apply the actuating force to the acoustic black hole.

Optionally the method comprises controlling the actuator to control at least one of:
(a) the vibration of the primary structure;
(b) a flexural wave in the primary structure;
(c) the acoustic radiation from the primary structure.

Optionally the method comprises controlling the actuator to control at least one of features (a) to (c) by controlling the vibration of the damper structure and/or a flexural wave in the damper structure.

According to a fourth aspect of the invention there is provided a kit of parts of a structural damper, the kit of parts comprising:
- an acoustic black hole;
- at least one sensor;
- a damper structure;
- an actuator for applying an actuating force to the damper structure; and
- a controller configured to control the actuator in dependence on a signal from the at least one sensor so as to provide structural damping of a primary structure.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

In this respect the actuator, sensor and structural damper in the method of the third aspect of the invention may be of, or the, structural damper according to the first aspect of the invention.

Other preferred and advantageous features of the invention will be apparent from the following description.

DESCRIPTION OF THE DRAWINGS

Embodiments of the present invention will now be described by way of example only with reference to the accompanying drawings of which.

DETAILED DESCRIPTION

Figure 1:
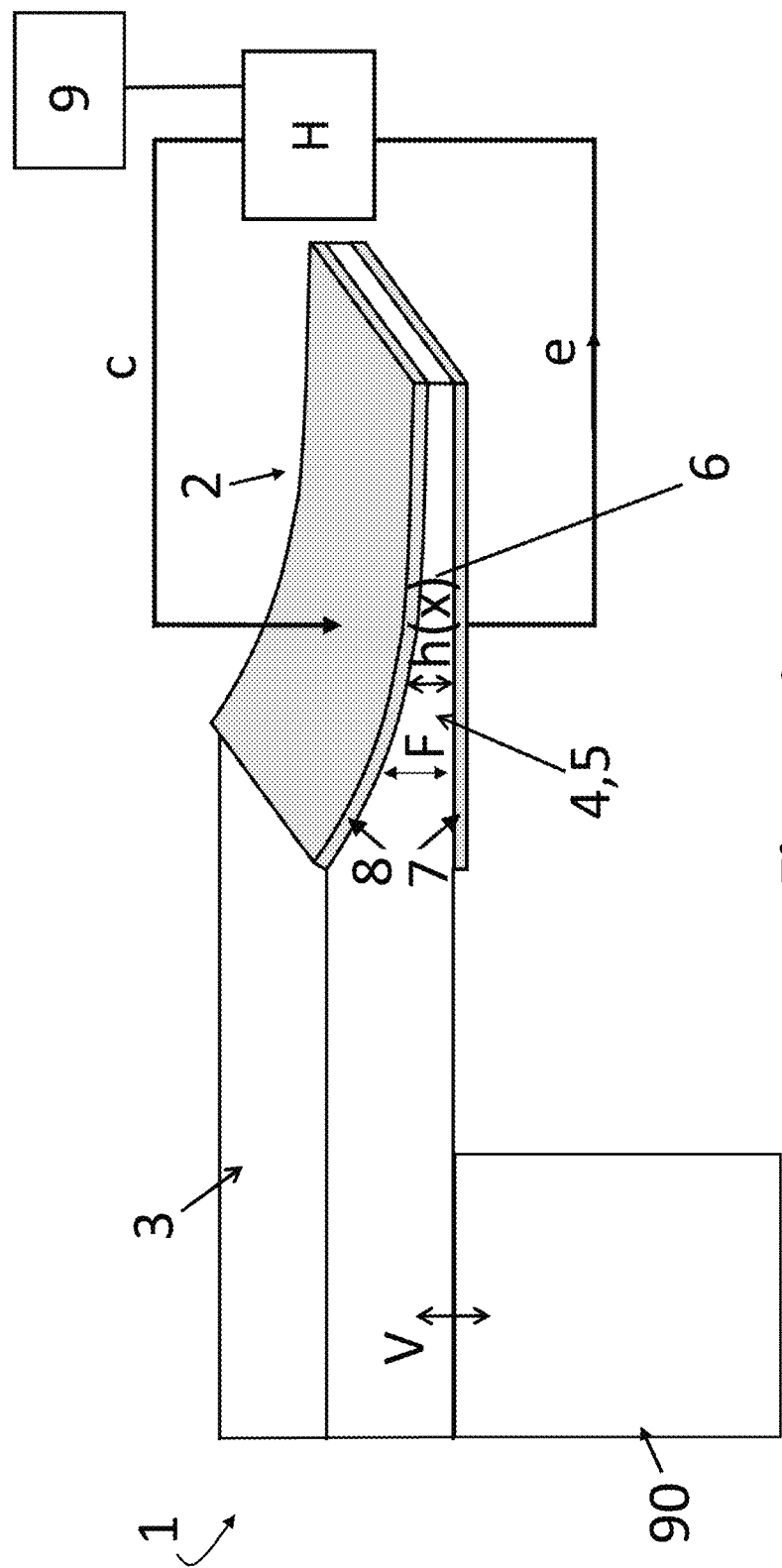
FIG. 1 shows a structurally damped structure according to a first embodiment of the invention.

Referring to FIG. 1 there is shown a structurally damped structure 1 according to a first embodiment of the invention. The structurally damped structure 1 comprises a primary structure 3 in the form of a rectangular beam 3 and a structural damper 2, at the end of the beam 3, configured to provide structural damping of the beam 3.

The term 'primary structure' is used to refer to a structure that the structural damper 2 is arranged to provide structural damping to. The primary structure is a structure that, in use, has a vibration applied to it. The primary structure may be a structure that is vibrated, directly or indirectly, by a source of vibration (e.g. an engine, fluid flow, etc.).

In this respect, the beam 3 is attached, at one end, to a vibration source 90 (shown schematically in FIG. 1) which, in this case, is an engine. The vibration source 90 produces a vibratory excitation force (V) at that end of the beam 3, which induces vibration and flexural waves in the beam 3. This also causes the beam 3 to emit acoustic radiation, i.e. noise.

The structural damper 2 has a damper structure 4, that comprises an acoustic black hole 5, provided at the opposite end of the beam 3 (to the vibration source 90). The damper structure 4 (and the acoustic black hole 5) is embedded in the beam 3, at the end of the beam 3. In the currently described embodiment the damper structure 4 is the acoustic black hole 5.

Figure 9:
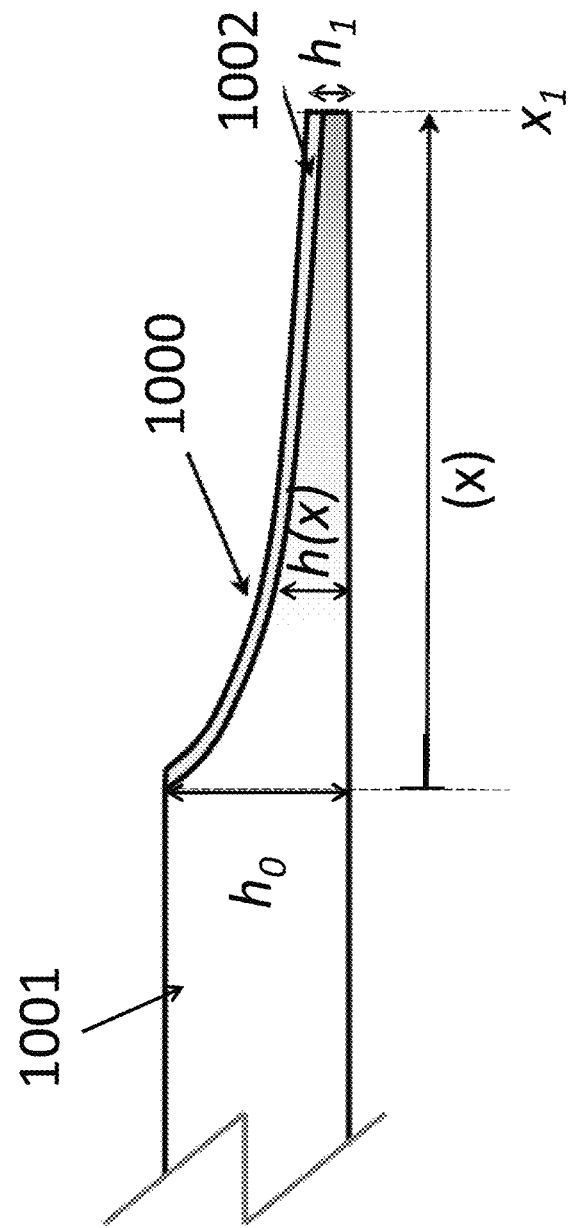
FIG. 9 provides an illustration of the structure of a known acoustic black hole (ABH)

The acoustic black hole 5 comprises an end section 6 of the beam 3 of tapering thickness (h), whereby the thickness (h) of the beam 3 decreases towards its downstream end (i.e. the end opposite the end attached to the vibration source (90)) according to the following power law profile:

$$h(x) = h_0\left(1 - \frac{x}{x_0}\right)^n \qquad (2)$$

Where the variables in this equation are as defined for Table 1 (and FIG. 9)

It will be appreciated that references to 'upstream' and 'downstream' are in relation to the location of the applied excitation force on the primary structure, due to the vibration source, and the direction of travel of the flexural waves travelling along the primary structure from the location of the applied excitation force, i.e. the flexural waves travel downstream from the point of excitation.

However, it will be appreciated that any type of acoustic black hole may be used.

The change in thickness profile causes the flexural waves to decrease in wave speed along the length of the acoustic black hole 5, thereby reducing the reflection of the flexural waves from the acoustic black hole 5 and so effectively providing attenuation of the flexural waves.

The end section 6 of the beam 3 that forms the acoustic black hole 5 is provided on its upper and lower surfaces with upper and lower piezo-electric transducer (PZT) patches 8, 7 respectively.

The upper and lower PZT patches 7, 8 are each of a material that has an intrinsic level of damping and so provide passive damping at the acoustic black hole 5.

The lower PZT patch 7 acts as a sensor that senses the movement of the acoustic black hole section 6 of the beam 3. In this respect, the movement of the ABH section 6 acts to deform the PZT patch 7, which causes a voltage to be induced across the PZT patch 7 that is representative of the deformation. The PZT patch 7 is connected to a controller (H) (shown schematically in FIG. 1) such that the voltage induced across the PZT patch 7 is passed to the controller (H), forming an error signal (e) that is fed back to the controller (H) (i.e. a feedback signal).

The upper PZT patch acts as an actuator 8 configured to apply an actuating force (F) to the acoustic black hole 5.

The controller (H) is connected to an electrical power supply 9 (shown schematically in FIG. 1) and has an output that is connected to the upper PZT patch 8.

The controller (H) is configured to produce a control signal (c), in the form of an output voltage, that is applied across the upper PZT patch 8, in dependence on the error signal (e).

The voltage applied to the upper PZT patch 8 causes it to deform (i.e. through expansion or contraction) to apply an actuating force (F) to the acoustic black hole 5. In this respect, energy is input from the actuator 8 into the acoustic black hole 5.

The actuating force (F) is parallel to the plane of the flexural waves that travel along the beam 3 due to excitation by the vibration source 90.

The controller (H) is configured to control the upper PZT patch 8 (i.e. the actuator) in dependence on the received error signal (e) so as to provide structural damping of the beam 3 (i.e. of the primary structure 3).

In this respect, the controller (H) controls the actuating force (F) applied by the upper PZT patch 8, to the acoustic black hole 5, so as to attenuate (in this case minimise), the vibration of the beam 3 (i.e. of the primary structure).

Furthermore, the acoustic black hole 5 acts to control (namely to reduce) the flexural vibrations produced on the beam 3, by the vibration source 90.

In the currently described embodiment the controller (H) controls the actuating force applied by the actuator 8, to the acoustic black hole 5, to control vibration of the beam 3 (i.e. the primary structure) using the following direct velocity feedback control:

$$c(n) = -H(z)e(n) \quad (3)$$

Where c(η) is the control signal, e(η) is the error signal, η is the time index and H(z) is a simple gain.

However, it will be appreciated that any suitable controller may be used in place of H(z), being that either digital or analogue in nature.

Alternatively, or additionally, the controller (H) may be configured to control the absorption of vibration by the damper structure 4.

It will be appreciated that any suitable type and arrangement of sensors and actuators may be used. In this respect, it will be appreciated that the upper and lower PZT patches could be reversed, i.e. the actuator provided on the lower surface and the sensor provided on the upper surface.

As stated above, the actuator 8 is configured to apply the actuating force to the acoustic black hole 5. This may advantageously act to control the vibrational energy in the acoustic black hole 5, which may cause the actuator 8 to have a greater damping effect. Accordingly this may allow for a reduction in the size (and strength) of the actuator 8, than would otherwise be required.

Furthermore, the use of the controller (H) and actuator 8, to provide a controlled actuating force to the damper structure 4 may advantageously improve the low-frequency performance of the acoustic black hole 5, which may allow for the use of structural damping, using an acoustic black hole, in a more effective way and in a wider variety of applications. It may also reduce resonances that would otherwise occur.

Figure 2:
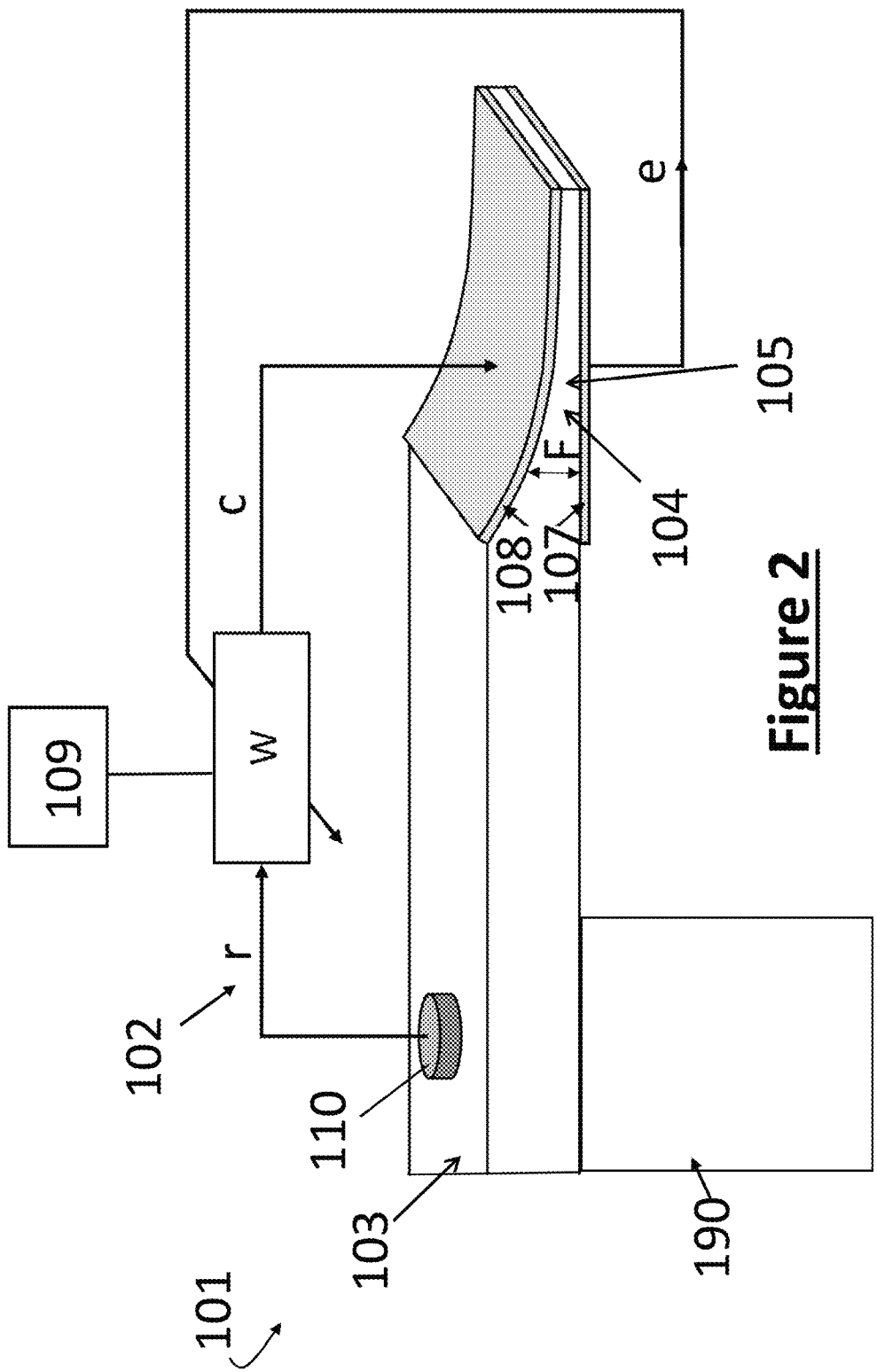
FIG. 2 shows a structurally damped structure according to a second embodiment of the invention.

Referring to FIG. 2 there is shown a structurally damped structure 101 according to a second embodiment of the invention. The structurally damped structure 101 is the same as the structurally damped structure 1 of the first embodiment, except for the differences described below. Corresponding features are given corresponding reference numerals, but incremented by 100.

The structurally damped structure 101, of the second embodiment, differs from that of the first embodiment in that a sensor 110 is mounted on the beam 103, configured to sense the vibration of the beam 103. In the currently described embodiment the sensor 110 is a PZT sensor. However, it will be appreciated that any suitable type of sensor may be used.

The sensor 110 is located upstream of the upper PZT patch 108 at the acoustic black hole 105, i.e. upstream of the actuator 108. The sensor 110 is connected to the controller (which, in this embodiment, is designated as 'W') so as to provide a feed forward reference signal (r) to the controller (W) that corresponds to the vibrating movement of the beam 103 at the location of the sensor 110.

As with the first embodiment, the lower PZT patch 107 provides a feedback error signal (e) (corresponding to the deflection of the ABH section 6 of the beam 3) to the controller (W). However, in this embodiment, the feedback error signal (e) is used to vary the coefficients of the transfer function of the controller (W) such that the controller adapts so as to continue to minimise the vibration of the beam 3 (i.e. of the primary structure). In this respect, the controller (W) is an adaptive controller.

The controller (W) is configured to output a control signal (c), in the form of an output voltage applied across the upper PZT patch (108) in dependence on the received feedforward reference signal (r) and the feedback error signal (e) so as to control the vibration of the beam 103. In this respect, the controller (W) is configured to minimise the vibration of the beam 103.

In the currently described embodiment the controller (W) controls the vibration of the beam 103 and this controller can be implemented using a Finite Impulse Response (FIR) filter, where the coefficients can be updated as follows using the well-known filtered-reference least mean squares algorithm:

$$w(n+1) = \gamma w(n) - \alpha r^T(n)e(n) \quad (4)$$

Where w is the filter coefficient, n is the time index, α is the convergence gain, γ is the leakage coefficient, r is the vector of current and past filtered-reference signals and e is the error signal.

However, it will be appreciated that any suitable controller may be used.

Figure 3:
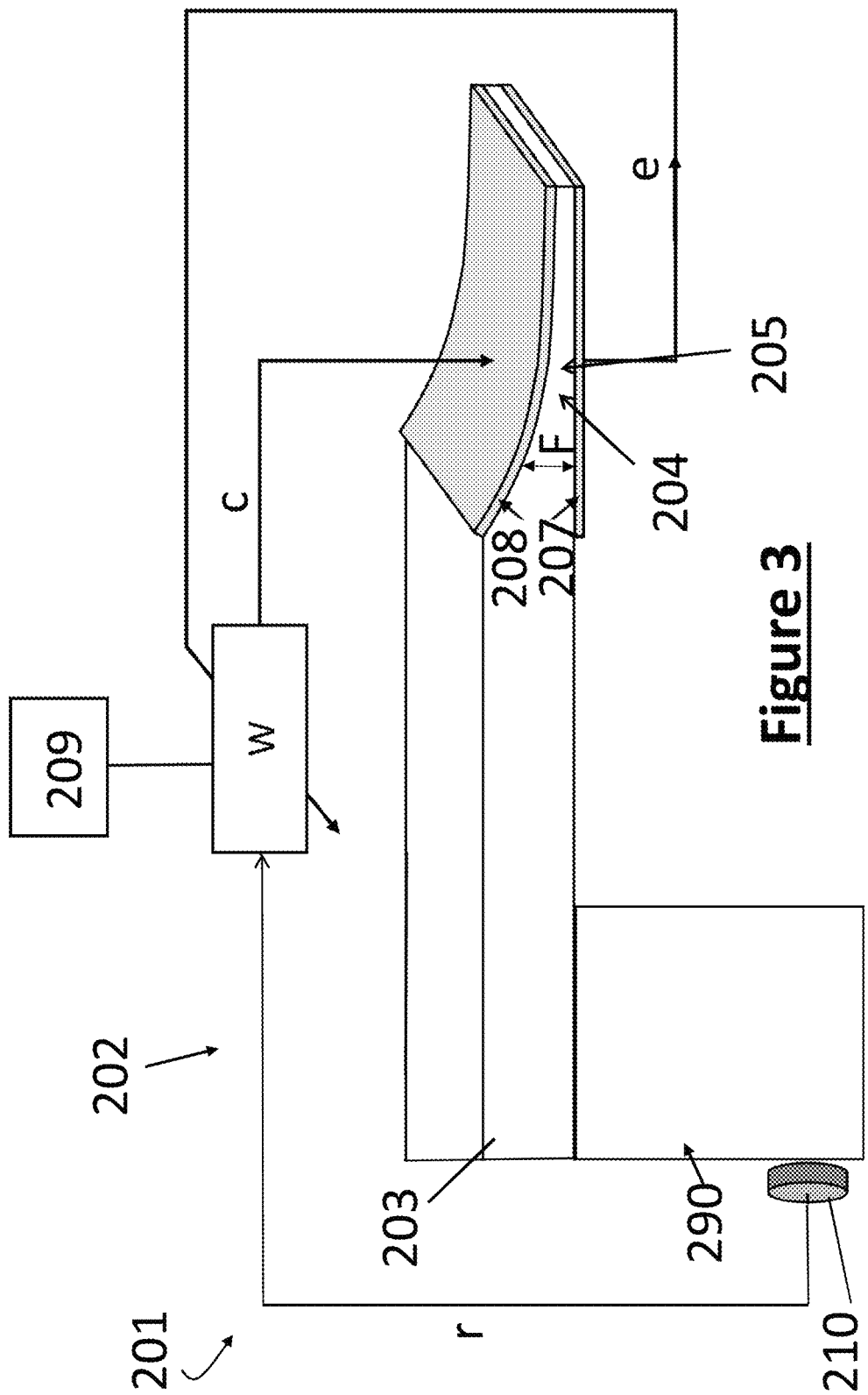
FIG. 3 shows a structurally damped structure according to a third embodiment of the invention.

Referring to FIG. 3 there is shown a structurally damped structure 201 according to a third embodiment of the invention. The structurally damped structure 201 is the same as the structurally damped structure 101 of the second embodiment, except for the differences described below. Corresponding features are given corresponding reference numerals, but incremented by 100.

The structurally damped structure 201, of the third embodiment, differs from that of the second embodiment in that the sensor 210 is mounted on the vibration source 290 and is configured to sense the vibration of the vibration source 290 and to provide the sensed vibration as the feed-forward reference signal (r) to the controller (W).

As with the second embodiment, the adaptive controller (W) is configured to output a control signal (c), in the form of an output voltage applied across the upper PZT patch 208 in dependence on the received feedforward reference signal (r) and the feedback error signal (e) so as to control the vibration of the beam 203. In this respect, the controller (W) is configured to minimise the vibration of the beam 203.

In the currently described embodiment the controller (W) controls the vibration of the beam 204 using a corresponding control algorithm to that in the second embodiment.

However, it will be appreciated that any suitable controller may be used.

Figure 4:
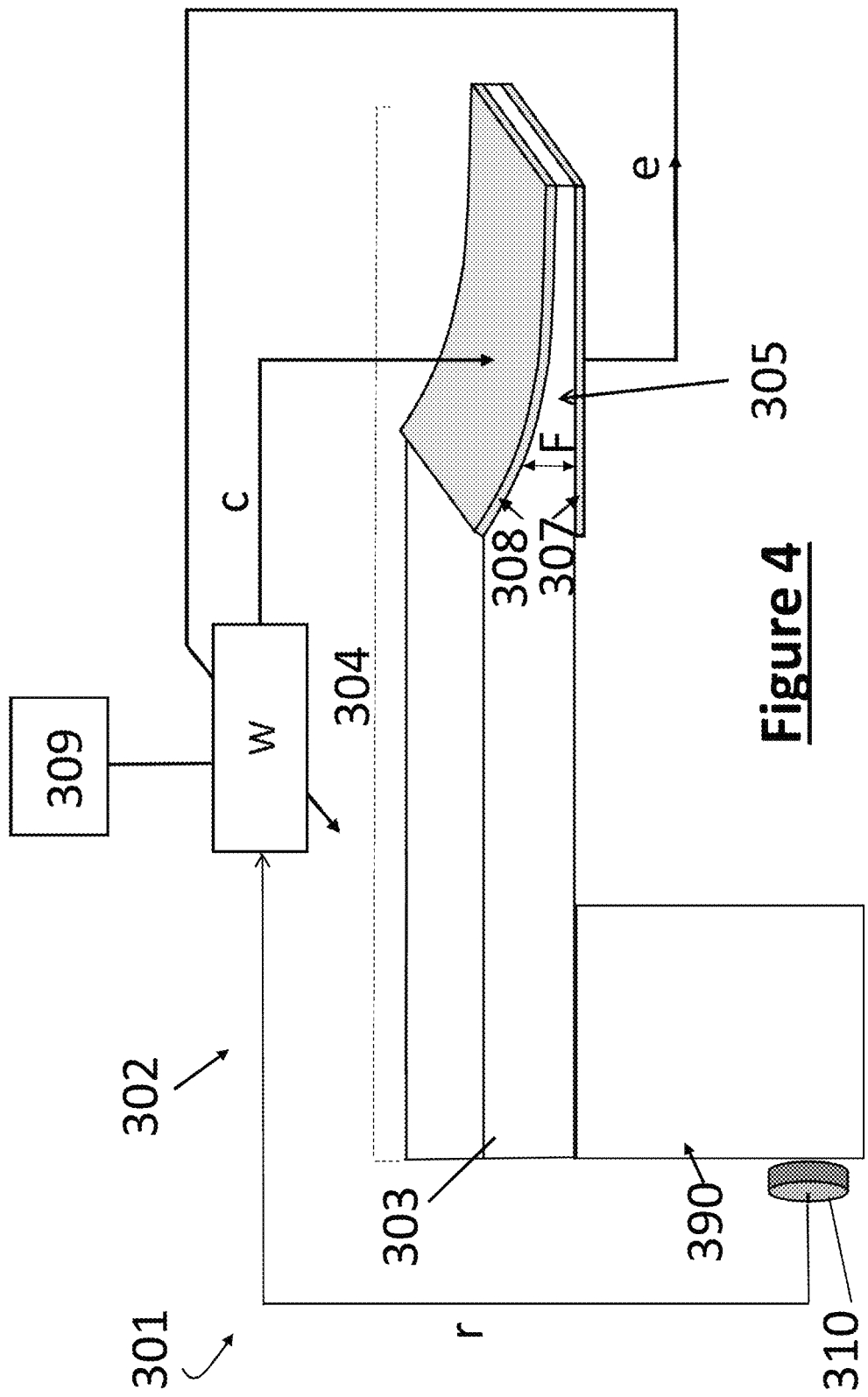
FIG. 4 shows a structurally damped structure according to a fourth embodiment of the invention.

Referring to FIG. 4 there is shown a structurally damped structure 301 according to a fourth embodiment of the invention. The structurally damped structure 301 is the same as the structurally damped structure 201 of the third embodiment, except for the differences described below. Corresponding features are given corresponding reference numerals, but incremented by 100.

The structurally damped structure 301, of the fourth embodiment, differs from that of the third embodiment in that the primary structure is an engine casing 390 (which is vibrated by an engine housed by the casing 390). The damper structure 304 is formed by the beam 303 (i.e. the entire beam), including the acoustic black hole 305 that is embedded in the beam 303, at the end of the beam 303. In this respect, the damper structure 304 comprises the acoustic black hole 305.

The controller (W) is configured to control the vibration of the engine casing 390 (i.e. the primary structure) by controlling the vibration of the damper structure 304.

In this respect, the controller (W) minimises the filtered version of the vibration according to the following:

$$w(n+1) = \gamma w(n) - \alpha r^T(n) o e(n) \quad (5)$$

Where w is the filter coefficient, n is the time index, α is the convergence gain, γ is the leakage coefficient, r is the vector of current and past filtered-reference signals, e is the error signal and o is an observation, or remote sensing filter designed to estimate the response at the desired minimisation position on the primary structure from the response measured on the ABH 5.

However, it will be appreciated that any suitable transfer function may be used.

The controller (W) may be configured to control the absorption of vibration by the damper structure 304 (e.g. by maximising the absorption of the vibration by the damper structure 304).

The controller (W) may be configured to control any combination of the vibration of the engine casing 390 (i.e. the primary structure), a flexural wave in the engine casing 390 or the acoustic radiation from the engine casing 390 by controlling the vibration of the damper structure 304 and/or a flexural wave in the damper structure 304.

In this respect, the vibration of the damper structure 304 may be controlled (by the control of the actuator), so as to control the vibration of the engine casing 390. Alternatively, or additionally, the flexural wave in the damper structure 304 may be controller so as to control the vibration of the engine casing 390. The flexural wave in the damper structure 304 may be controlled so as to control the flexural wave in the engine casing 390. Alternatively, or additionally, the vibration of the damper structure 304 may be controlled so as to control the flexural wave in the engine casing 390. Similarly, the vibration of the damper structure 304 and/or a flexural wave in the damper structure 304 may be used to control the acoustic radiation from the engine casing 390. It will be appreciated that any suitable arrangement and type of sensors, and any suitable type of control system, may be used to provide these arrangements.

Figure 5:
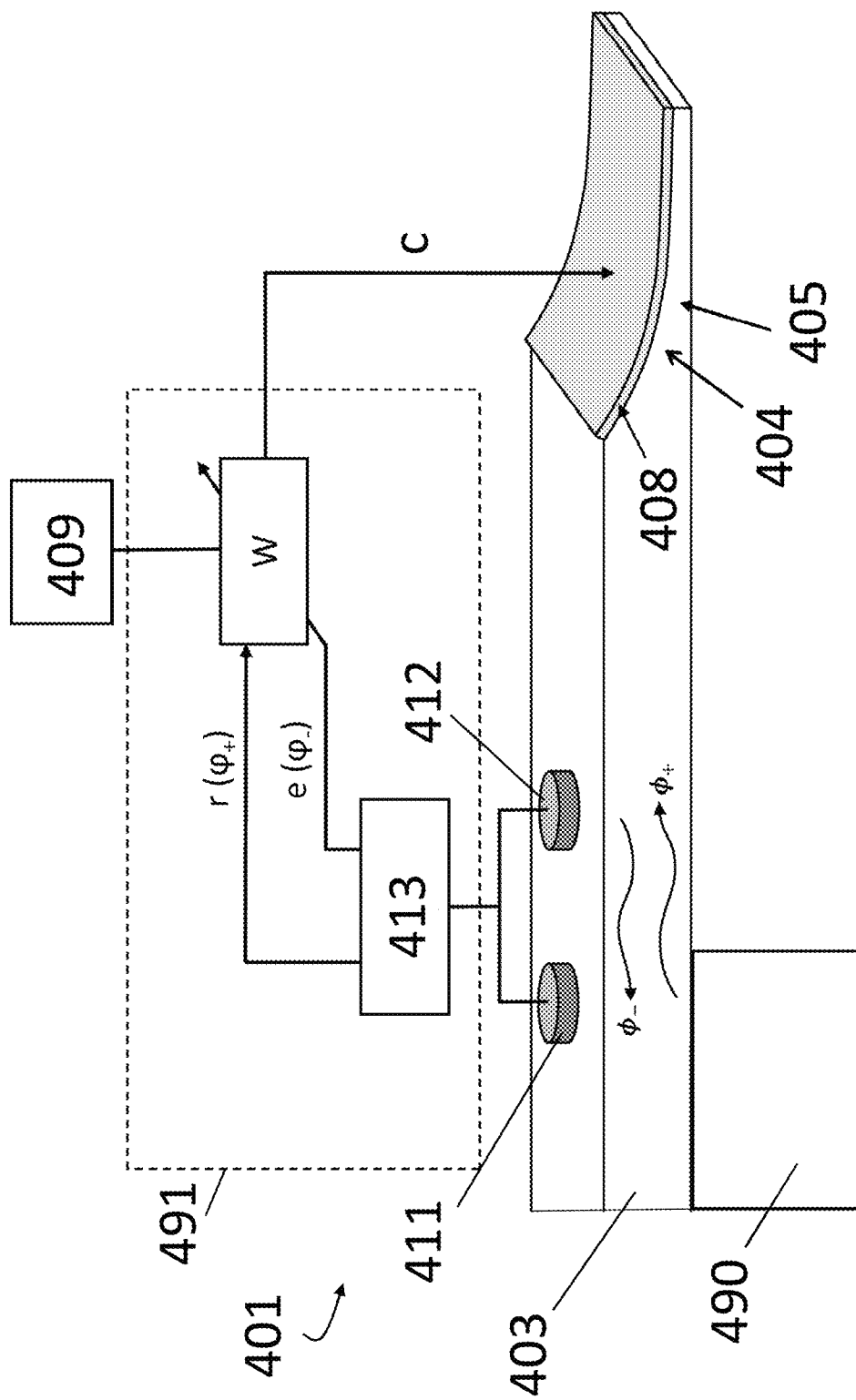
FIG. 5 shows a structurally damped structure according to a fifth embodiment of the invention.

Referring to FIG. 5 there is shown a structurally damped structure 401 according to a fifth embodiment of the invention. The structurally damped structure 401 is the same as the structurally damped structure 101 of the second embodiment, except for the differences described below. Corresponding features are given corresponding reference numerals, but incremented by 300 (relative to those of the second embodiment).

The structurally damped structure 401, of the fifth embodiment, differs from that of the second embodiment in that the sensor 110 is replaced with first and second sensors 411, 412 that are mounted on the beam 403, with the second sensor 412 positioned downstream of the first sensor 411.

The first and second sensors 411, 412 are PZT sensors that are configured to sense the displacement of the beam 403 at their respective locations.

The controller 491 comprises a control unit (W) and a wave decomposition unit 413. The sensors 411, 412 are connected to the wave decomposition unit 413 and the wave decomposition unit 413 is configured to decompose the vibration of the beam 404 into the incident and reflected wave components ($\phi_+$ and $\phi_-$). The incident component is used as the feedforward reference signal (r) and the reflected component is used as the feedback error signal (e).

In the described embodiment the lower PZT patch is not present and there is no feedback signal from a lower PZT patch, as in the preceding embodiments.

The control unit (W) is configured to output a control signal (c), in the form of an output voltage applied across the upper PZT patch 308 in dependence on the received feedforward reference signal (r) and feedback error signal (e) so as to control the reflected wave from the ABH 5. In this respect, the controller (W) is configured to attenuate the reflected wave from the ABH 5. Accordingly the controller (W) acts to control the flexural wave in the primary structure 403 (i.e. the beam 403).

In the currently described embodiment the controller (W) controls the reflected wave from the ABH 5 using the following control algorithm:

$$w(n+1) = \gamma w(n) - \alpha \phi_+^T(n) \phi_-(n) \quad (6)$$

Where w is the filter coefficient, n is the time index, α is the convergence gain, γ is the leakage coefficient, $\phi_+$ is the vector of reference signals provided by the measured incident wave filtered by the plant response and $\phi_-$ is the measured reflected wave.

However, it will be appreciated that any suitable control algorithm may be used.

Figure 6:
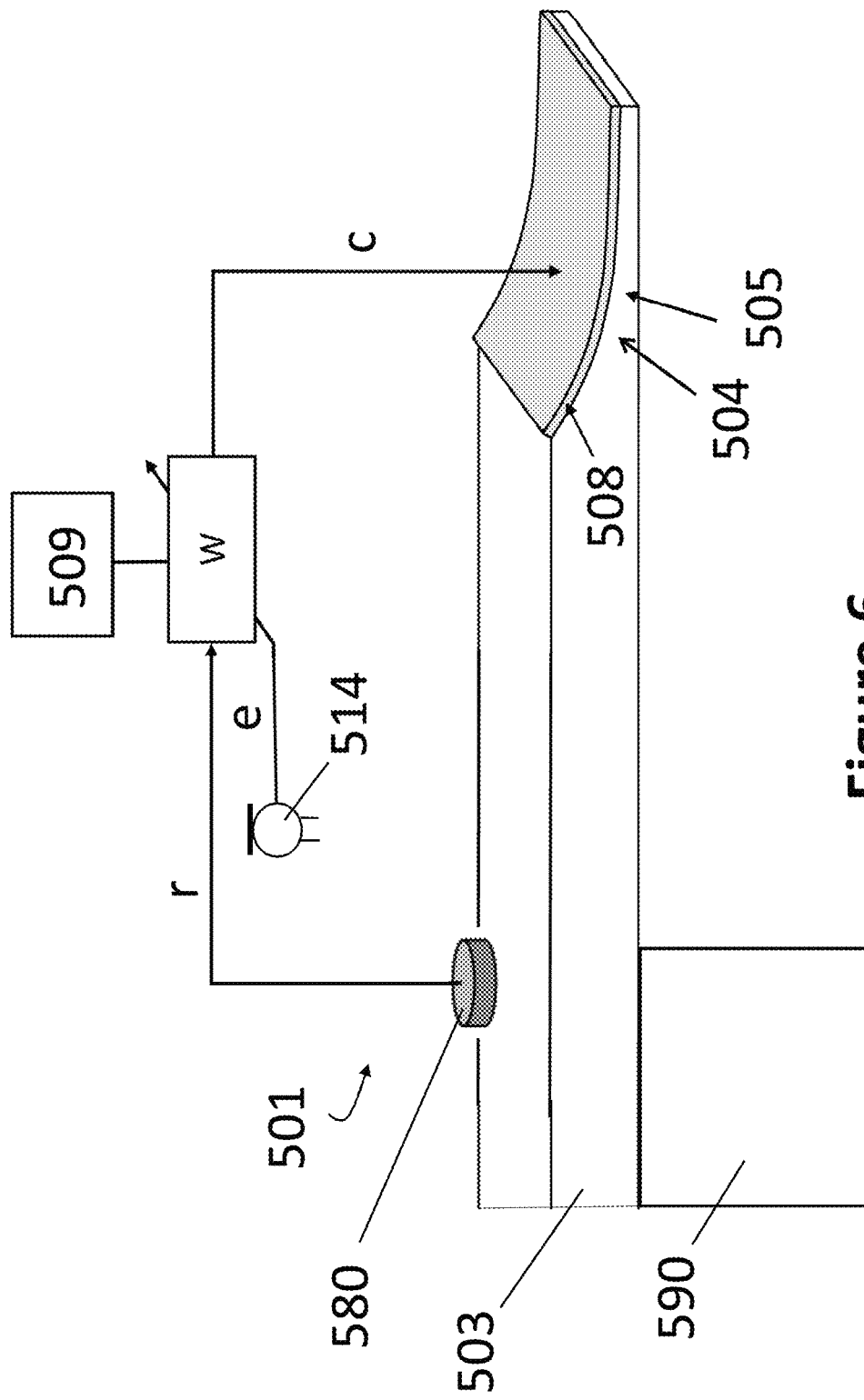
FIG. 6 shows a structurally damped structure according to a sixth embodiment of the invention.

Referring to FIG. 6 there is shown a structurally damped structure 501 according to a sixth embodiment of the invention. The structurally damped structure 501 is the same as the structurally damped structure 401 of the fifth embodiment, except for the differences described below. Corresponding features are given corresponding reference numerals, but incremented by 100.

The structurally damped structure 501, of the sixth embodiment, differs from that of the fifth embodiment in that the first and second sensors 411, 412 are replaced by an acoustic sensor, in the form of a microphone 514, located in the radiated sound field of the beam 503 (i.e. of the primary structure). In an alternative embodiment, multiple acoustic sensors may be used at different locations in the radiated sound field.

The microphone 514 is connected to an input of the controller (W) and passes this sound signal, as an error signal (e), to the controller (W).

A movement sensor 580 is mounted on the beam 503 upstream of the actuator 580 and provides a feedforward reference signal (r) to the controller (W).

The controller (W) is configured to output a control signal (c), in the form of an output voltage applied across the upper PZT patch 508 in dependence on the feedforward reference signal (r) and on the error signal (e) so as to control the acoustic radiation from the beam 503. In this respect, the controller (W) is configured to minimise the acoustic radiation from the beam 503 (i.e. from the primary structure).

In the currently described embodiment the controller (W) controls the acoustic radiation from the beam 503 using the same control algorithm as in the second embodiment (except that the error signal (e) is provided by the microphone 514).

However, it will be appreciated that any suitable control algorithm may be used.

Figure 7:
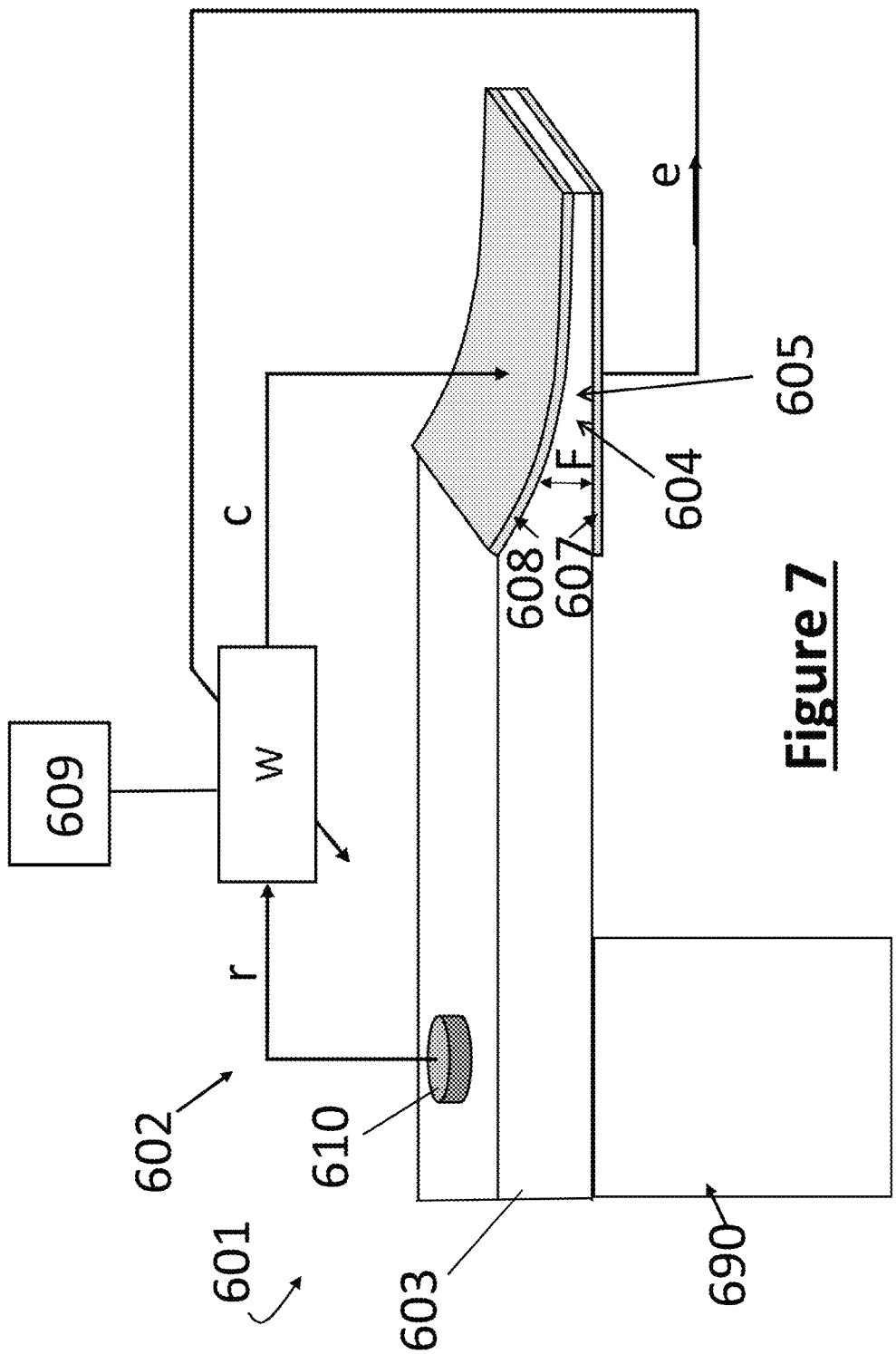
FIG. 7 shows a structurally damped structure according to a seventh embodiment of the invention.

Referring to FIG. 7 there is shown a structurally damped structure 601 according to a seventh embodiment of the invention. The structurally damped structure 601 is the same as the structurally damped structure 501 of the sixth embodiment, except for the differences described below. Corresponding features are given corresponding reference numerals, but incremented by 100.

The structurally damped structure 601, of the seventh embodiment, differs from that of the sixth embodiment in that the microphone 514 is replaced with a PZT sensor 607 mounted on the lower surface of the ABH 605. The PZT sensor 607 is configured to measure the displacement of the ABH 5 and to provide a feedback error signal (e) to the controller (W).

The controller (W) is configured to output a control signal (c), in the form of an output voltage applied across the upper PZT patch 608 in dependence on the received feedforward reference signal (r) and feedback error signal (e) so as to control the acoustic radiation from the beam 603. In this respect, the controller (W) is configured to minimise the acoustic radiation from the beam 603.

In the currently described embodiment the controller (W) controls the acoustic radiation from the beam 603 using the following algorithm:

$$w(n+1)=\gamma w(n)-\alpha r^T(n)oe(n) \quad (7)$$

Where w is the filter coefficient, n is the time index, $\alpha$ is the convergence gain, $\gamma$ is the leakage coefficient, r is the vector of current and past filtered-reference signals, e is the error signal and o is an observation filter that estimates the radiated sound field by suitably filtering the structural error sensor 607.

However, it will be appreciated that any suitable control algorithm may be used.

Figure 8:
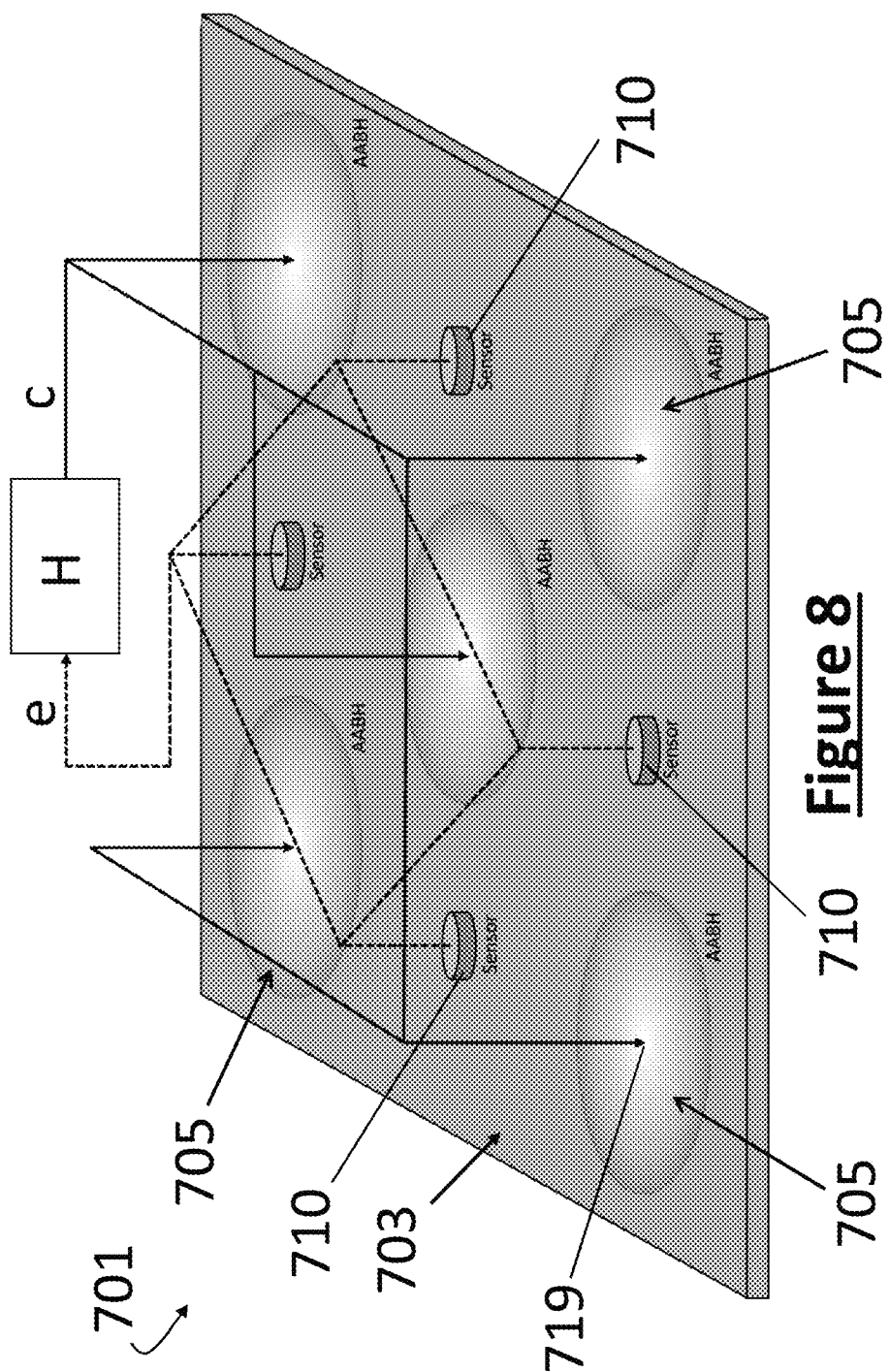
FIG. 8 shows a structurally damped structure according to an eighth embodiment of the invention.

Referring to FIG. 8 there is shown a structurally damped structure 701 according to an eighth embodiment of the invention. Corresponding features (to those of the sixth embodiment) are given corresponding reference numerals, but incremented by 100.

In the eighty embodiment, the primary structure is a two-dimensional structure in the form of a relatively thin flat plate 703. The plate 703 comprises a plurality, of 2-D acoustic black holes 705 that are embedded in the plate 703. In the currently described embodiment there are 5 acoustic black holes 705, with an acoustic black hole 705 located in each corner of the upper surface of the plate 703 and a further acoustic black hole 705 located in the centre of the upper surface of the plate 703.

Each two-dimensional acoustic black hole 705 is in the form of a generally circular indentation in the upper surface of the plate 703, providing a profile of tapering thickness.

However, it will be appreciated that any type of acoustic black hole may be used.

It will be appreciated that each part of the plate 703 that forms one of the acoustic black holes 705 forms a damper structure 704 that forms part of the plate 703 (i.e. part of the primary structure).

A plurality of displacement sensors 710 are mounted on the upper surface of the plate, generally in the spaces between the acoustic black holes 705. Each sensor 710 is a PZT sensor configured to detect the displacement of the plate 703 at the location of the sensor 710. Each sensor in turn is connected to a controller (H) so as to provide a feedback error signal that corresponds to the deflection of the plate 703 at that location.

An actuator 719, in the form of a PZT actuator, is provided at the centre of each acoustic black hole 705 (shown schematically by the vertical arrow 719 at the centre of each acoustic black hole 705). The PZT actuator 719 is of a material that has an intrinsic level of damping and so provides a damping effect at the ABH 705.

The controller (H) is configured to control each actuator 719 in dependence on the received error signals (e) from the sensors 710 so as to provide structural damping of the plate 703 (i.e. the primary structure).

In this respect, each 2-D ABH, coupled with the controller (H) and the actuating force applied by each actuator 719 acts so as to control the vibration of the plate 703. The controller (H) is configured to minimise the vibration of the plate 703.

In the currently described embodiment, the controller (H) controls the vibration of the plate 703 using the following centralised, fully coupled control law:

$$c(n)=-H(z)e(n) \quad (8)$$

Where c(n) is the vector of control signals, H(z) is the transfer function describing the controller and e(n) is the vector of error signals.

However, it will be appreciated that any suitable control law, including centralised and decentralised formulations and digital and analogue implementations, may be used.

Alternatively, or additionally, the controller (H) may be configured to control the absorption of vibration of the plate 703 (e.g. by maximising the absorption of the vibration of the plate 703).

Figure 10:
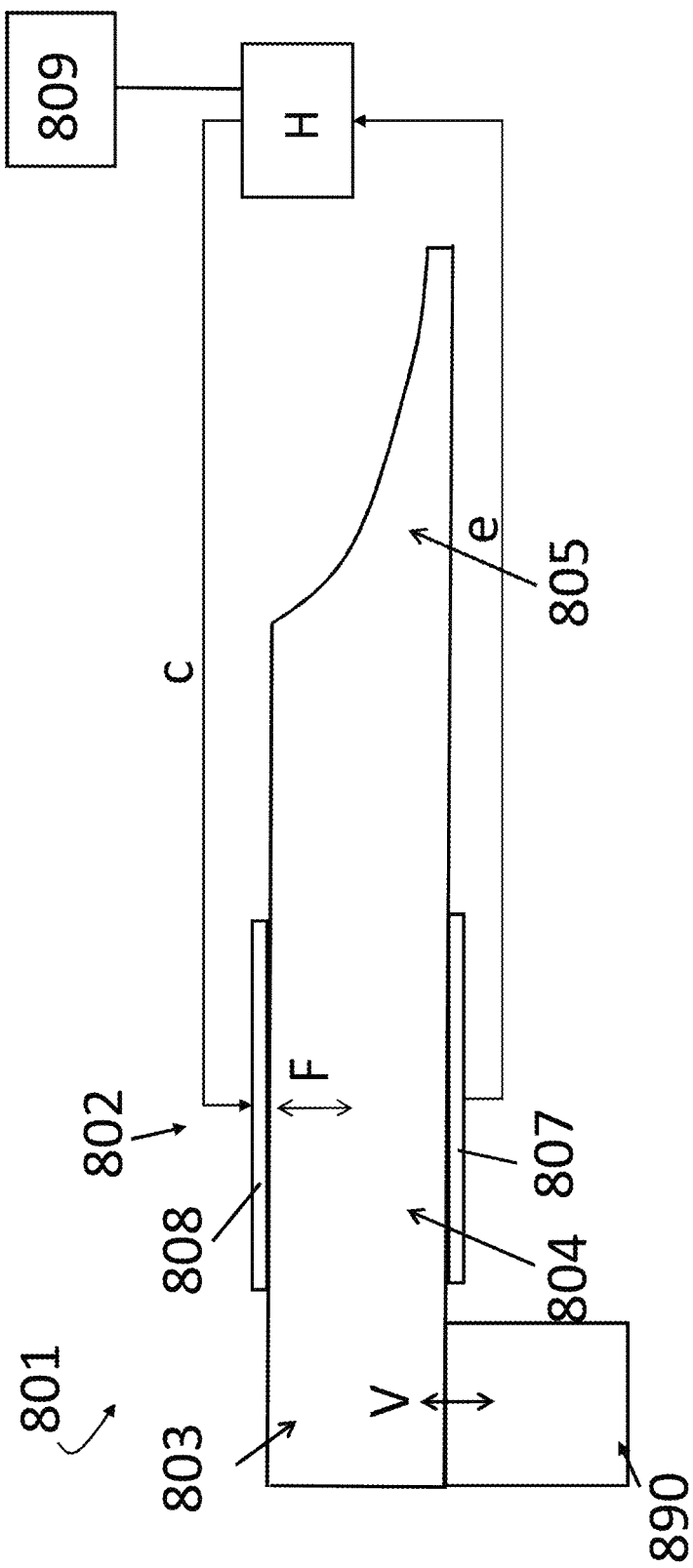
FIG. 10 shows a structurally damped structure according to a ninth embodiment of the invention.

Referring to FIG. 10 there is shown a structurally damped structure 801 according to a ninth embodiment of the invention. The structurally damped structure 801 of the ninth embodiment is the same as the structurally damped structure 1 of the first embodiment, except for the differences described below. Corresponding features are given corresponding reference numerals, but incremented by 700.

The structurally damped structure 801 of the ninth embodiment is the same as the structurally damped structure 1 of the first embodiment, except in that the upper and lower PZT patches 7, 8 are at a different location to the acoustic black hole 805.

In this respect, the upper PZT patch 808 is configured to apply the actuating force (F) to the damper structure 802 at a different location to the acoustic black hole 805. This is advantageous in that the actuator does not reduce the acoustic black hole effect by loading the tapered part of the damper. It may also allow thinner taper tip heights to be used since the taper does not have to support the mass of the actuator and it allows the passive damping treatment to be optimised without constraints imposed by the collocation of the actuator with the taper.

Similarly, the lower PZT patch 807 is configured to sense the movement of the beam 803 at a different location to the acoustic black hole 805.

In each of the described embodiments, the use of the controller and actuator(s), to provide a controlled actuating force to the damper structure may advantageously improve the low-frequency performance of an acoustic black hole, which may allow for the use of structural damping, using an acoustic black hole, in a more effective way and in a wider variety of applications. It may also reduce resonances that would otherwise occur.

Whilst the present invention has been described and illustrated with reference to particular embodiments, it will be appreciated by those of ordinary skill in the art that the invention lends itself to many different variations not specifically illustrated herein.

For example, in each of the described embodiments any suitable corresponding type of sensor or actuator may be used. In this respect, the sensor(s) may be of any suitable type, including displacement sensor, a velocity sensor, a strain sensor, a vibration sensor, an accelerometer, etc. The actuator may be of any suitable type, including a PZT, an electro-magnetic actuator, a pneumatic or hydraulic actuator, etc.

In addition, the location, number and arrangement of the actuators and sensors may be varied and is not limited to that of the described embodiments.

In certain the described embodiments, the actuator is configured to apply the actuating force to the acoustic black hole. Alternatively, it may be configured to apply the actuating force to a different location on the damper structure, i.e. not at the acoustic black hole.

Any of the control/actuation/sensor arrangements of any of the above described embodiments may be combined, in any combination, to control one or more of the vibration of the primary structure, a flexural wave in the primary structure and the acoustic radiation from the primary structure.

The structurally damped structure 701 of the eighth embodiment may have any of the sensor, actuator and control arrangements of any of the preceding embodiments so as to control the vibration, reflected wave and/or acoustic radiation from the primary structure.

In embodiments where the controller is an adaptive controller, a non-adaptive controller may be used instead (and vice-versa). However, use of an adaptive controller may be advantageous as it may provide improved damping that adapts to changing external conditions.

The primary structure, of any of the embodiments in FIGS. 1 to 7 may be provided with a plurality of the respective structural dampers of that embodiment, so as to provide structural damping of the primary structure at multiple locations. Furthermore, the primary structure may be provided with a plurality of structural dampers that are a mixture of more than one of the described embodiments.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A structural damper comprising:
   an acoustic black hole;
   at least one sensor;
   a damper structure;
   an actuator configured to apply an actuating force to the damper structure at a different location to the acoustic black hole; and
   a controller configured to control the actuator in dependence on a signal from the at least one sensor so as to provide structural damping of a primary structure.

2. The structural damper according to claim 1, wherein the damper structure comprises the acoustic black hole.

3. The structural damper according to claim 1, wherein the controller is configured to control the actuating force applied by the actuator, to the damper structure, so as to control at least one of:
   (a) the vibration of the primary structure;
   (b) a flexural wave in the primary structure;
   (c) the acoustic radiation from the primary structure.

4. The structural damper according to claim 3, wherein the controller is configured to control at least one of features (a) to (c) by controlling: the vibration of the damper structure; and/or a flexural wave in the damper structure.

5. The structural damper according to claim 4, wherein the controller is configured to control at least one of features (a) to (c) by controlling the vibration of the damper structure.

6. The structural damper according to claim 4, wherein the controller is configured to control at least one of features (a) to (c) by controlling a flexural wave in the damper structure.

7. The structural damper according to claim 6, wherein the controller is configured to control the reflected flexural wave from the acoustic black hole.

8. The structural damper according to 3, wherein the controller is configured to control the acoustic radiation from the primary structure.

9. The structural damper according to claim 8, wherein the at least one sensor is an acoustic sensor configured to sense the acoustic radiation from the primary structure.

10. The structural damper according to claim 1, wherein the acoustic black hole is provided with passive damping.

11. The structural damper according to claim 1, wherein the at least one sensor comprises first and second sensors and the controller comprises a wave decomposition unit configured to decompose the signals from the first and second sensors into incident and reflected wave components.

12. A structurally damped structure comprising:
   the primary structure, and
   the structural damper according to claim 1, arranged to provide structural damping of the primary structure.

13. The structurally damped structure according to claim 12, wherein the primary structure is a structure of a vehicle.

14. A structural damper comprising:
   an acoustic black hole;
   at least one sensor configured to sense acoustic radiation from a primary structure;

a damper structure;

an actuator configured to apply an actuating force to the damper structure; and a controller configured to calculate a radiated sound field from the primary structure in dependence on a signal from the at least one sensor and control the actuator, so as to provide structural damping of the primary structure.

15. The structural damper according to claim 14, wherein the damper structure comprises the acoustic black hole, and the actuator is configured to apply the actuating force to the acoustic black hole.

16. The structural damper according to claim 14, wherein the actuator is configured to apply the actuating force to the damper structure at a location different from a location of the acoustic black hole.

17. A structurally damped structure comprising:

the primary structure, and the structural damper according to claim 14, arranged to provide structural damping of the primary structure.

18. A method of providing structural damping to a primary structure, using a structural damper, the structural damper comprising: an acoustic black hole; at least one sensor; a damper structure; and an actuator configured to apply an actuating force to the damper structure at a location different from a location of the acoustic black hole; wherein the method comprises:

controlling the actuator in dependence on a signal from the at least one sensor so as to provide structural damping of a primary structure.

19. The method according to claim 18, wherein the damper structure comprises the acoustic black hole and the actuator is configured to apply the actuating force to the acoustic black hole.

20. The method according to claim 18, wherein the method comprises controlling the actuator to control at least one of:

(a) the vibration of the primary structure;

(b) a flexural wave in the primary structure;

(c) the acoustic radiation from the primary structure.

* * * * *